(12) United States Patent
Franitza et al.

(10) Patent No.: US 7,746,448 B2
(45) Date of Patent: Jun. 29, 2010

(54) MEASURING APPARATUS

(75) Inventors: Karsten Franitza, Baden (CH); Bernd Fehrmann, Nussbaumen (CH); Matthias Hoebel, Windisch (CH); Peter Lang, Sulz (CH)

(73) Assignee: ALSTOM Technology Ltd., Baden (CH)

( * ) Notice: Subject to any disclaimer, the term of this patent is extended or adjusted under 35 U.S.C. 154(b) by 4 days.

(21) Appl. No.: 12/173,882

(22) Filed: Jul. 16, 2008

(65) Prior Publication Data
US 2008/0297761 A1 Dec. 4, 2008

Related U.S. Application Data

(63) Continuation of application No. PCT/EP2006/069642, filed on Dec. 13, 2006.

(30) Foreign Application Priority Data
Feb. 2, 2006 (CH) .................................. 00169/06

(51) Int. Cl.
*G01C 3/08* (2006.01)
(52) U.S. Cl. .................................. 356/4.05
(58) Field of Classification Search ....... 356/3.01–3.15, 356/4.01–4.1, 5.01–5.15, 6–22, 128, 128.5, 356/141.1, 141.2, 141.3
See application file for complete search history.

(56) References Cited

U.S. PATENT DOCUMENTS 5,936,736 A 8/1999 Suzuki et al.

| | | | |
|---|---|---|---|
| 6,667,458 B1 | 12/2003 | Sirat | |
| 6,995,385 B2 * | 2/2006 | Tomita et al. | 250/559.38 |
| 7,327,440 B2 * | 2/2008 | Horn | 356/4.03 |
| 2003/0048355 A1 * | 3/2003 | Shimoyama et al. | 348/79 |
| 2005/0077470 A1 | 4/2005 | Tichit et al. | |

FOREIGN PATENT DOCUMENTS

| EP | 1605230 | 12/2005 |
|---|---|---|
| WO | WO2007/087931 | 8/2007 |

OTHER PUBLICATIONS

Search Report for Swiss Patent App. No. 0169/2006 (May 9, 2006).
International Search Report for PCT Patent App. No. PCT/EP2006/069642 (Mar. 19, 2007).

* cited by examiner

*Primary Examiner*—Thomas H Tarcza
*Assistant Examiner*—Luke D Ratcliffe
(74) *Attorney, Agent, or Firm*—Cermak Nakajima LLP; Adam J. Cermak

(57) ABSTRACT

A measuring apparatus (1) for contactless detection of a distance between a surface (7) of a measurement object (8) and the measuring apparatus (1), and for simultaneous contactless visual detection of the surface (7), has a measuring head (2) holding a distance measuring device (4), a camera apparatus (5) and an illumination device (6), the illumination device (6) illuminating an operating point (9) on the surface (7) of the measurement object (8) that is simultaneously focused by the camera apparatus (5) and the distance measuring device (4). On an optical axis (10), between the illumination device (6) and the operating point (9), a mirror and filter device (11), that has at least one dichroic mirror (12) that transmits or reflects light beams as a function of wavelength, and thereby splits light reflected by the operating point (9) between the distance measuring device (4) and the camera apparatus (5), is provided.

12 Claims, 5 Drawing Sheets

MEASURING APPARATUS

This application is a Continuation of, and claims priority under 35 U.S.C. §120 to, International application no. PCT/EP2006/069642, filed 13 Dec. 2006, and claims priority therethrough under 35 U.S.C. §§119, 365 to Swiss application no. 00169/06, filed 2 Feb. 2006, the entireties of which are incorporated by reference herein.

BACKGROUND

1. Field of Endeavor

The present invention relates to a measuring apparatus for contactless detection of a distance between a surface of a measurement object and the measuring apparatus, and for simultaneous contactless visual detection of the surface.

2. Brief Description of the Related Art

During the operation of a gas turbine, the most strongly loaded gas turbine blades of the first stage are exposed to hot gas temperatures of above 1400° C. For their protection, these are therefore provided with metallic anti-oxidation layers and, frequently, additionally with ceramic thermal barrier coatings (TBCs). A reliable operation of the turbines over typical intervals can be ensured with the aid of these protective layers even under extreme conditions of use. However, after these intervals it is chiefly the anti-oxidations layers that are consumed, and they no longer offer adequate protection, and so the turbine blade has to be removed and replaced. Because of the high value of such a turbine blade, repair, and thus a recycling of the components, are of great commercial interest. The protective layers can in this case be renewed by firstly removing the consumed layers by a chemical process, and thereupon coating the turbine blades anew. As in the case of the initial production, it is mostly plasma spraying methods that are applied. However, in the case of reconditioning it must be ensured that the original properties of the turbine blades are retained, a key role being played by the internal cooling system of the turbine blade, formed in particular by a complex network of interlinked bores and cooling channels. The restoration of this cooling system is mandatory for the turbine blades strongly loaded by the action of hot gas, in order to be able to release the turbine blades for a further operating interval. However, during the coating of used turbine blades the problem occurs that the originally open cooling air bores are stopped by the renewed coating with the metallic anti-oxidation layer or with the ceramic thermal barrier coating, the result being that the cooling of the turbine blades is drastically worsened and no longer satisfies the operating requirements. For this reason, a special machining process is required for reopening such stopped cooling channels.

The reconditioning process for opening the cooling air bores sealed during the recoating requires the detection of cooling hole positions and orientations. The general result in this case, particularly for conically opening cooling air bores, is depressions that can be detected by means of a distance measuring device.

U.S. Pat. No. 6,667,458 B1 discloses a system and a method for determining a specific distance between a laser system and a surface of a workpiece. The system includes an optical apparatus for focusing the laser beam on the surface of the workpiece, and a mirror device that deflects radiation reflected by the workpiece to a distance measuring device. The distance measuring device can be a conoscope, for example. The distance measuring device is connected to a control device that is designed for positioning the workpiece, that is to say for varying a distance between the measuring system and the workpiece. In this case, the known system detects only a distance between the surface of the workpiece and the measuring system.

SUMMARY

One of numerous aspects of the present invention relates to a measuring apparatus with the aid of which it is possible, in particular, for cooling air bores in turbine blades to be detected and recorded in a particularly reliable fashion, and thereby reliable cooling of the turbine blades after renewal of a thermal barrier coating can thereby being ensured.

Another aspect of the present invention is based on the general idea of providing, on a measuring apparatus, a measuring head that holds a distance measuring device, a camera apparatus, and an illumination device, and that is designed for the contactless detection of a distance between a surface of the measurement object and the measuring apparatus, and at the same time detects the surface of the measurement object visually, likewise in a contactless fashion. Particular attention is accorded here to a compact design, as large an operating distance as possible from the measurement object, a resolution/magnification optimized for the application, and a high-intensity, preferably coaxial illumination. In this case, the operating point on the surface of the measurement object is illuminated by the illumination device in a fashion as free as possible from shadows and simultaneously recorded by the camera apparatus or is focused and measured by the distance measuring device. In order to be able to achieve the most compact design possible, there is located, on an optical axis between the illumination device and an operating point on the surface of the measurement object, a mirror and filter device that has at least one dichroic mirror that transmits or reflects light beams as a function of their wavelength and thereby splits light reflected by the operating point between the distance measuring device and the camera apparatus. The common operating point facilitates the calibration of the measuring head on a measuring machine such as, for example, a robot. By comparison with individual operating points, machine movements, and therefore measuring time and positioning errors, can be reduced with the aid of the inventive measuring apparatus that operates with a single operating point for imaging and distance measurement.

The inventive mirror and filter device, which uses the dichroic mirror to split the reflected light beams between the distance measuring device and the camera apparatus as a function of their wavelength, renders it possible to record both the distance from the surface and a visual image thereof, this being done, moreover, with the aid of a very compact measuring head that is particularly suitable for operating at sites with difficult access, owing to its small overall space requirement.

A positioning device is expediently provided with the aid of which the camera apparatus and/or the distance measuring device and/or the illumination device can be adjusted relative to one another. Consequently, manufacturing tolerances in the structure of the measuring apparatus can easily be compensated, and the distance measuring device and the camera apparatus can carry out fine tuning of the individual operating points. To this end, it is preferably possible to displace and lock the camera apparatus and/or the distance measuring device and/or the illumination device in the three spatial axes with the aid of the positioning device. Alternatively, it is conceivable that, for example, one of the abovenamed devices can be displaced in two directions, and that the remaining third spatial axis is adjusted by adjusting the mirror and filter device.

It is expedient for the camera apparatus and the distance measuring device to be arranged parallel to one another in or on the measuring head. The parallel arrangement permits a particularly compact design, the result being a substantial reduction in the overall space of the measuring head, and therefore an improvement in the handling of said measuring head.

In a further advantageous embodiment exemplifying principles of the present invention, the illumination device has at least an LED, in particular a blue LED, and/or a halogen and/or a xenon light source that preferably emits blue light. In particular, by comparison with white light or light of some other color, blue light has the advantage that it has little influence on the distance measuring device, which preferably operates with a red laser beam. For example, the red spectrum is likewise contained in white light, and this can have a disadvantageous effect on the signal quality of the distance measuring device. Again, optimum contrasts for imaging can be achieved in the case of blue light, since the preferably red laser light of the distance measuring device does not influence the blue light for the camera apparatus. In particular, this yields advantages with regard to the deflection of the red light with the aid of the dichroic mirror and filter device, something which would not be achievable with light of a different color.

In a further advantageous embodiment of the invention, the camera apparatus has a telecentric zoom objective and/or a remote microscope attachment, and preferably operates with a digital image memory. A telecentric zoom objective offers the advantage of a higher resolution and, in association therewith, a high image quality of the recorded surface, as well as the possibility of easy and precise setting. A remote microscope attachment permits an exact detailed picture of the surface observed, it thereby being possible to localize the cooling air bores more effectively, thus rendering possible, on the basis of the substantially improved survey data, a subsequent additional opening of the cooling air bores with higher accuracy. In this case, the zoom objective and/or the remote microscope attachment can preferably be driven by motor. The digital image memory offers the advantage that the image data can be transmitted, for example via a network, to a downstream machine that accomplishes the opening of the coated cooling air bores. At the same time, such digital imaging is a basis for a high image quality in conjunction with low imaging costs, since it is possible to eliminate storage on conventional image carriers such as, for example, films. It is also likewise possible to eliminate additional processing of the films, since the digital imaging preferably permits the image files to be directly incorporated into the further processing procedure.

Further important features and advantages of the measuring apparatus follow from the drawings and from the associated description of the figures with the aid of the drawings.

BRIEF DESCRIPTION OF THE DRAWINGS

Preferred embodiments of the invention are illustrated in the drawings, and are explained in more detail in the following description. The same reference symbol(s) is used to refer to features that are essentially or functionally the same or similar.

Here, schematically in each case.

DETAILED DESCRIPTION OF EXEMPLARY EMBODIMENTS

Figure 1:
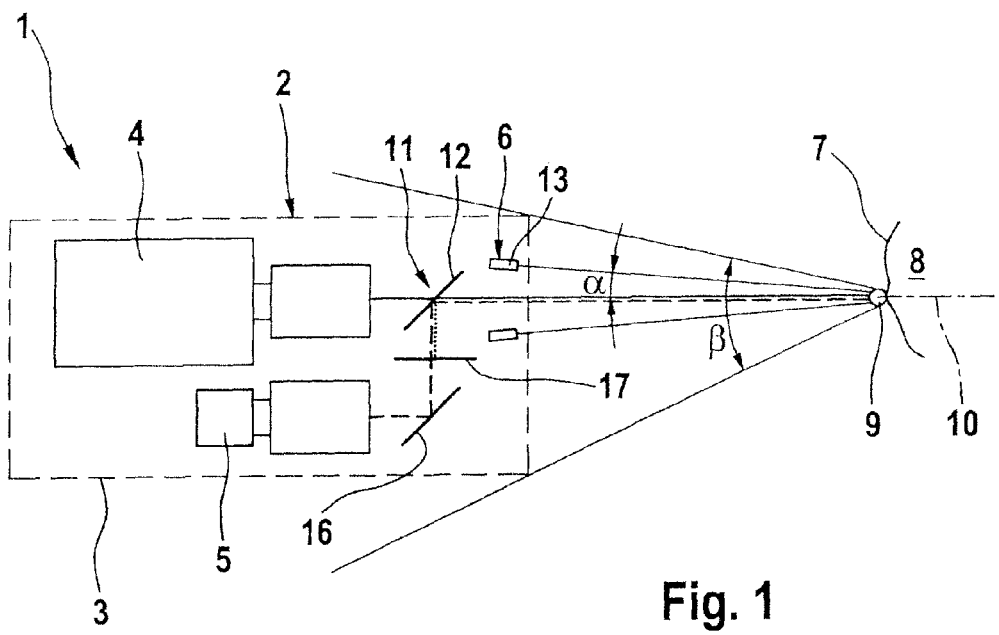
FIG. 1 shows a measuring apparatus having a camera apparatus and distance measuring device arranged parallel to one another.

According to FIG. 1, a measuring apparatus 1 has a measuring head 2 that is arranged in a housing 3, and a distance measuring device 4, a camera apparatus 5 and an illumination device 6. The measuring apparatus 1 is designed for the contactless detection of a distance between a surface 7 of a measurement object 8 and the measuring apparatus 1, as well as simultaneously detecting the surface 7 in a contactless, visual fashion. Here, the illumination device 6 illuminates an operating point 9 on the surface 7 of the measurement object 8, which is simultaneously focused on by the camera apparatus 5 and the distance measuring device 4. According to this exemplary embodiment, there is also provided, on an optical axis 10, a mirror and filter device 11 that has at least one dichroic mirror 12 that transmits or reflects light beams as a function of their wavelength and thereby splits light reflected by the operating point 9 between the distance measuring device 4 and the camera apparatus 5. Here, the dichroic mirror can be configured such that its transparency to the wavelength of the optical measuring apparatus 4 is greater than 70%, while it reflects other wavelengths by over 90%. However, in another design of the measuring apparatus 1 it is also conceivable that the transparency of the mirror 12 to the wavelength of the optical measuring apparatus 4 is greater than 70%, while it is transparent by over 90% to over wavelengths. An operating distance between the operating point 9 and the measuring apparatus is in this case preferably larger than 70 mm. As large an operating distance as possible is particularly advantageous for conducting the measuring process.

In accordance with FIG. 1, the illumination device 6 has at least a colored, in particular blue LED and/or a halogen and/or xenon light source 13 that preferably emits blue light. In order to obtain an illumination of the operating point 9 that is aligned as coaxially as possible with the optical axis 10, the illumination device 6 preferably has at least three punctiform light sources 13, for example the LEDs 13, that are arranged on an annular contour with reference to the optical axis 10 and are preferably aligned at an angle $\alpha<15°$ to the optical axis 10. It is also conceivable for the illumination device 6 to have a fiberoptics apparatus (not shown) with the aid of which light can be emitted onto the surface 7 of the measurement object 8 via light-guiding fibers, for example glass fibers, in a fashion as coaxial as possible with the optical axis 10 and in the direction of the operating point 9. It is likewise conceivable to provide, as illumination device 6, an optical device 14, for example a lens or mirror device, that focuses the light emitted by the illumination device 6 onto the operating point 9. Such an optical device 14 is illustrated by way of example in FIG. 9, and permits the arrangement of a light source 15 in a fashion eccentric to the optical axis 10, the light emitted by the light source 15 being deflected in the direction of the optical axis 10 by a preferably dichroic mirror 16.

The distance measuring device 4 can be designed, for example, as an optical distance sensor, and can operate with a laser that preferably generates a red laser beam. By contrast with blue light, which is emitted by the illumination device 6, the light emitted by the distance measuring device 4 therefore has another wavelength, the dichroic mirror 12 being, as mentioned initially, designed such that it transmits the light required for the distance measurement of the distance measuring device 4, while it deflects light of another wavelength, in particular blue light emitted by the illumination device 6, and feeds it to the camera apparatus 5.

The measuring principle of the optical distance measurement is based on emitting coherent light, for example laser beams, and analyzing the retroreflection by the surface 7 whose distance is to be determined. The radiation of the distance measuring device 4 may therefore be influenced only slightly by an optical filter in order to obtain useful measured data. This is achieved by arranging upstream of the distance measuring device 4 the dichroic mirror 12 that appears transparent to the wavelength of the distance measuring device 4 and reflects the other wavelengths of the visible light. The reflected image information is then captured by the camera apparatus 5. In this case, the camera apparatus 5 can be arranged either at right angles to the distance measuring device 4 or parallel thereto when the beam path is once again deflected with the aid of a mirror 16. The parallel arrangement of the distance measuring device 4 and the camera apparatus 5 leads to a slim and compact design such as appears to be particularly advantageous, especially for measuring turbine guide blades. However, it is also necessary to aim for as small an aperture angle $\beta$ as possible.

The mirror and filter device 11 and, in particular, the dichroic mirror 12, exert no influence on a component of more than 70%, in particular a component of more than 95%, of the radiation, reflected by the surface 7 of the measurement object 8 of the optical distance measuring device 4, although, nevertheless, a fraction of the reflected radiation is reflected at the dichroic mirror 12 and appears as interfering reflections on an image of the camera apparatus 5. For this reason, according to principles of the invention, a further possibility is provided in the imaging beam path for filtering the undesired reflections of the distance measuring device 4. Such filtering is designed in accordance with FIG. 1 as a filter 17, and arranged between the dichroic mirror 12 and the mirror 16.

In order to obtain as high an image quality as possible, the camera apparatus 5 can, for example, have a telecentric zoom objective and/or a remote microscope attachment. These two components permit a high resolution of the recorded image and thereby an exact determination of a position of cooling bore openings located on the surface 7. Moreover, the camera apparatus 5 has a digital image memory that permits both storage of the acquired image data and passing them on to machines occupied with the opening process of the cooling air openings. The digital acquisition of the surface 7 of the measurement object 8 enables these data to be further processed and passed on without any problem and without the need for the latter to be converted, for example scanned, in advance in an expensive fashion.

In order to be able to control the measuring head 2 more effectively, the latter can be connected in a communicating fashion to a robot, a computer, or a coordinate measuring machine such that the cooling air openings on the surface 7 of the measurement object 8 can be detected in a preferably virtually fully automatic fashion. It is also conceivable for the illumination device 6 and/or the distance measuring device 4 and/or the camera apparatus 5 to be computer controlled.

Figure 2:
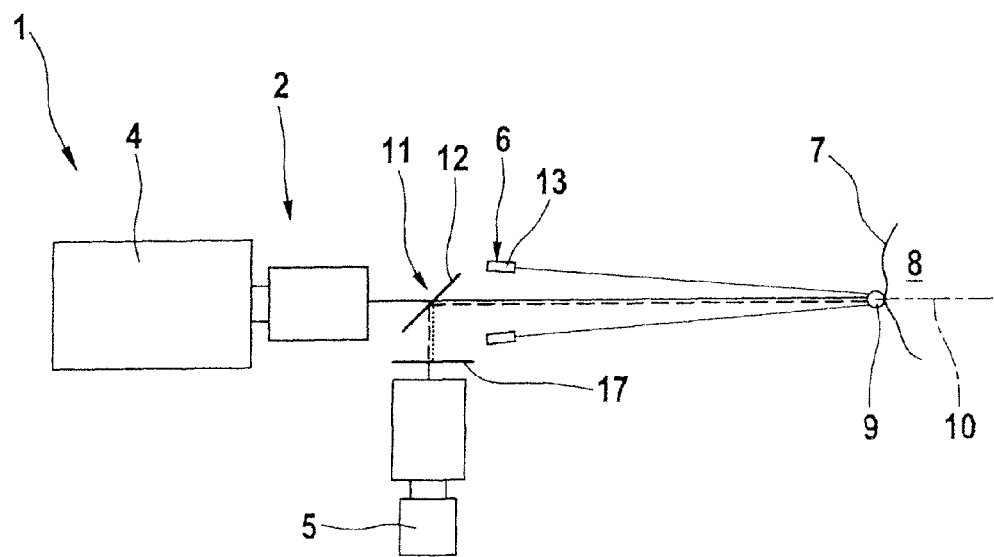
FIG. 2 shows an illustration as in FIG. 1, but with camera apparatus and distance measuring device arranged orthogonal to one another.

Illustrated in accordance with FIG. 2 is a measuring apparatus 1 that is distinguished from FIG. 1 merely in that the camera apparatus 5 is arranged orthogonal to the distance measuring device 4. The dichroic mirror 12 reflects the light required for the camera apparatus 5 and leads it to the camera apparatus 5 through the filter 17. Just as in FIG. 1, the illumination device 6 has point light sources 13, for example LEDs, arranged annularly around the optical axis 10. The signal required for the distance measuring device 4 penetrates the dichroic mirror 12 and passes to the distance measuring device 4 directly along the optical axis 10.

Figure 3:
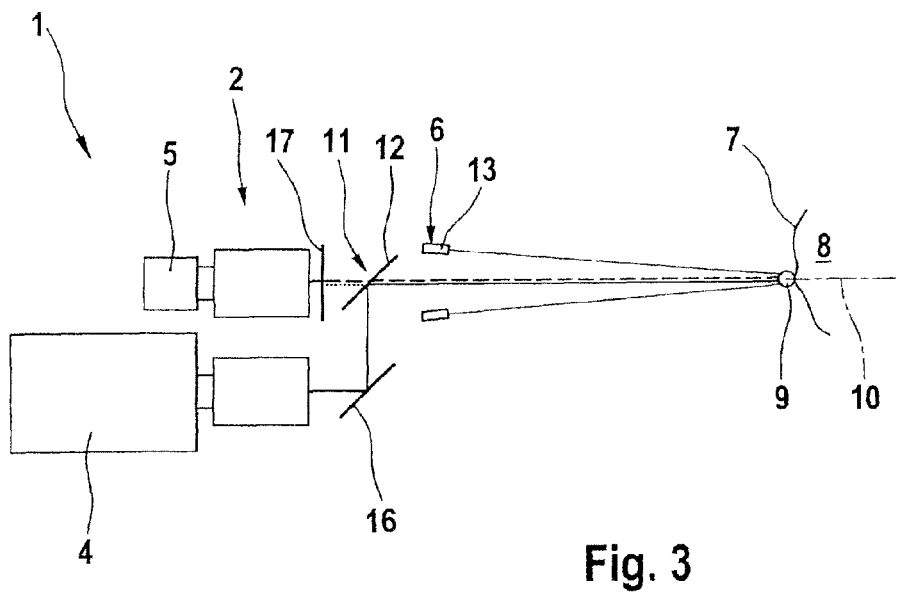
FIG. 3 shows an illustration as in FIG. 1, but with the camera apparatus lying on the optical axis.

In FIG. 3, the camera apparatus 5 is arranged substantially on the optical axis 10, while the distance measuring device 4 is arranged parallel thereto. This is the same in principle as the illustration in FIG. 1, but with a distance measuring device 4 and camera apparatus 5 which have exchanged positions. In accordance with FIG. 3, the dichroic mirror 12 is designed such that it reflects the light required for the distance measuring device 4 and deflects it to the mirror 16, which preferably reflects the light deflected to it by 100% and passes it on to the distance measuring device 4. In accordance with FIG. 3, the filter 17, which effects a reduction of undesired retroreflection of the distance measuring device 4, is arranged on the optical axis 10 of the filter 17 between the dichroic mirror 12 and the camera apparatus 5.

Figure 4:
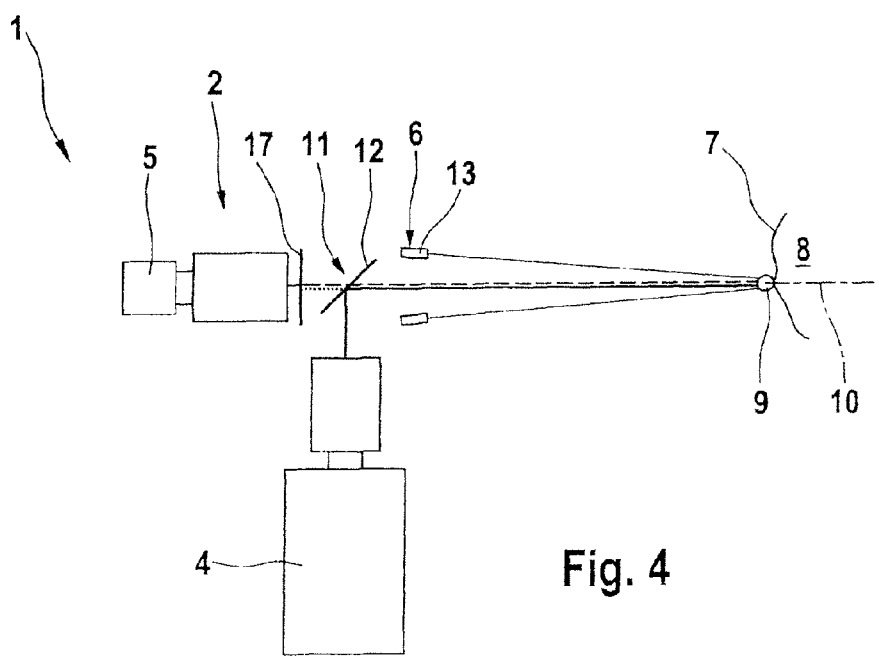
FIG. 4 shows an illustration as in FIG. 2, but with the camera apparatus lying on the optical axis.

In FIG. 4, the camera apparatus 5 is arranged as in FIG. 3, but in contradistinction thereto the distance measuring device 4 is arranged in a fashion orthogonal to the optical axis 10 such that the mirror 16 can be eliminated. Both in FIG. 3 and in FIG. 4, the illumination device 6 is formed by point light sources 13, for example LEDs or xenon light sources, that are arranged annularly about the optical axis 10. These point light sources 13 generate a light beam that preferably permits the operating point 9 to be illuminated virtually without shadows.

Figure 5:
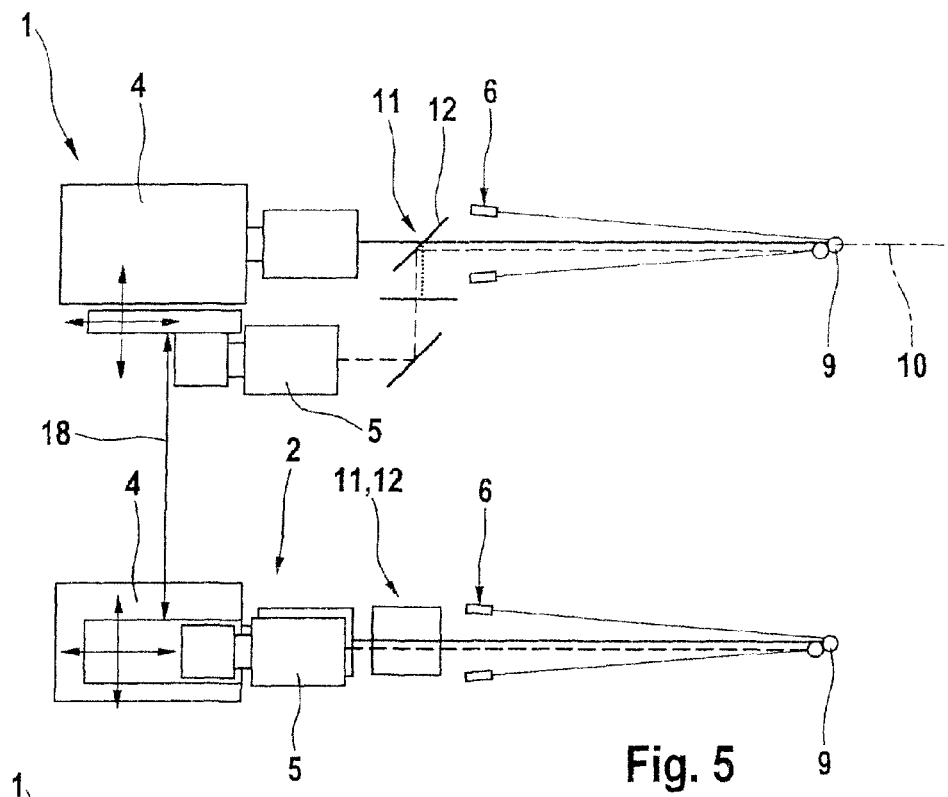
FIG. 5 shows an illustration as in FIG. 1, but with a positioning device for the camera apparatus.
Figure 6:
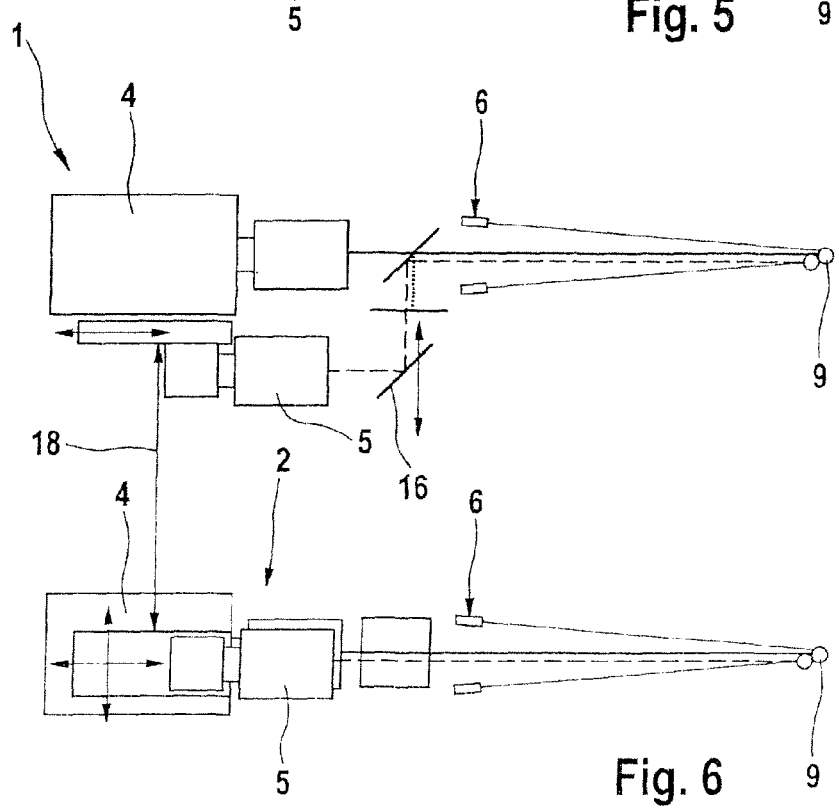
FIG. 6 shows an illustration as in FIG. 5, but for another embodiment.

Depicted in FIG. 5 is a positioning device 18 with the aid of which the camera apparatus 5 can be adjusted with reference to the distance measuring device 4 and/or in relation to the illumination device 6. The positioning device 18 permits compensation of manufacturing tolerances and fine tuning of the individual operating points of the distance measuring device 4 and the camera apparatus 5. In accordance with FIG. 5, the camera apparatus 5 can to this end be displaced and locked on the three spatial axes. It is also conceivable, as an alternative thereto, to mount the camera apparatus 5 such that it can be displaced in two directions, and to undertake to adjust the remaining direction by displacing the deflecting mirror 16, as shown in FIG. 6.

Figure 7:
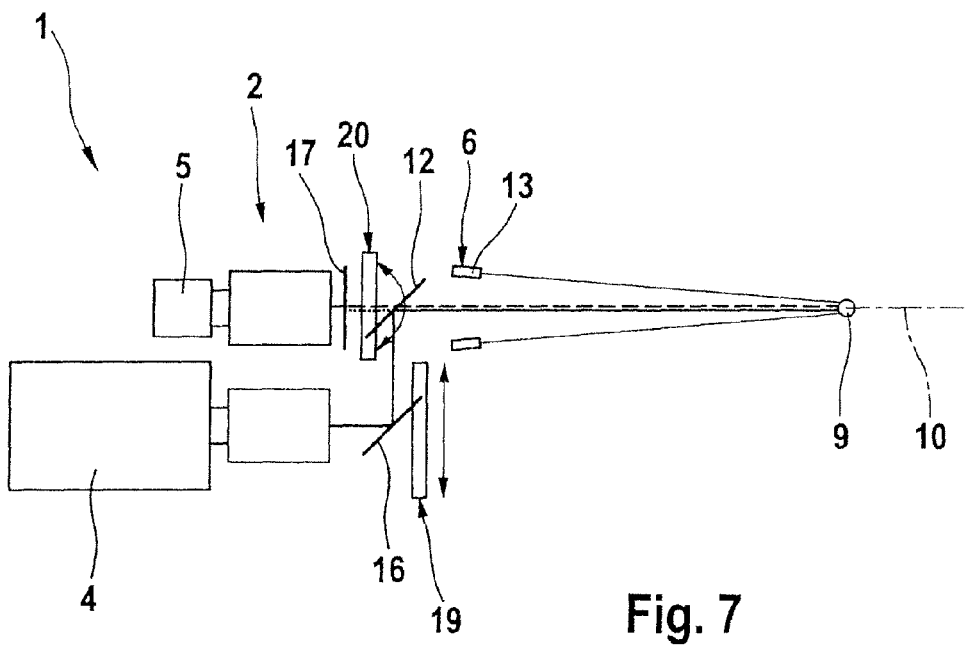
FIG. 7 shows an illustration as in FIG. 3, but with a positioning device for a mirror and filter device.
Figure 8:
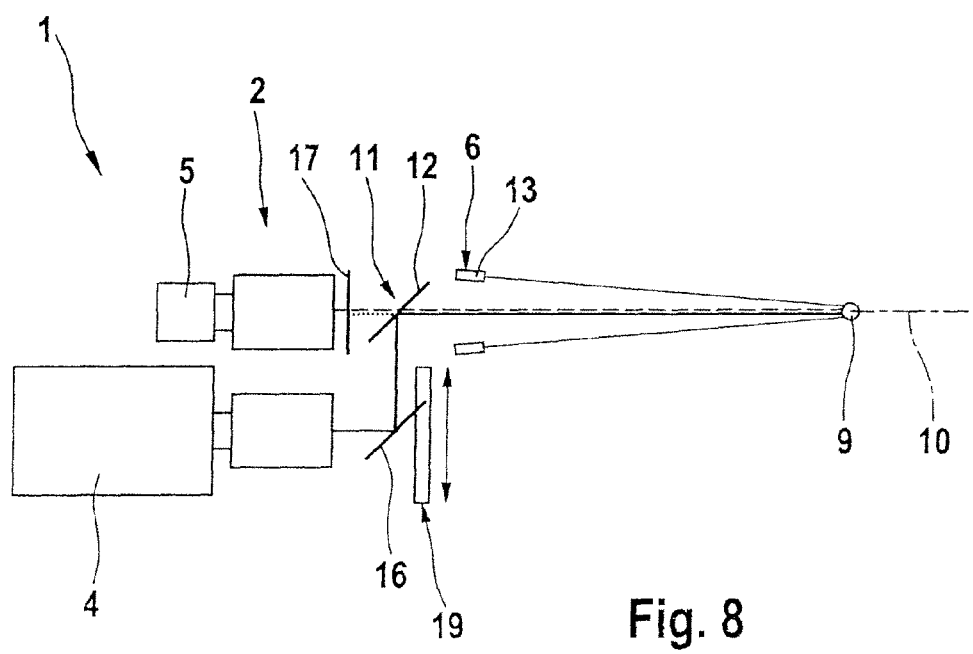
FIG. 8 shows an illustration as in FIG. 7, but for another embodiment.

In accordance with FIGS. 7 and 8, it is also possible to provide a mirror control device 19, preferably operating by translational rotation, or a mirror control device 20 preferably operating only by rotation, a three-dimensional acquisition of the distance information being enabled with the aid of two such mirror controls 19, 20 in accordance with FIG. 7, and a distance measuring device 4 that acquires the distance information in punctiform fashion. Only one mirror control device 19 is provided in FIG. 8, a three-dimensional determination of the distance information being enabled here by virtue of the fact that the distance measuring device 4 is also capable of acquiring distance information on a line running perpendicular to the plane of the drawing.

Figure 9:
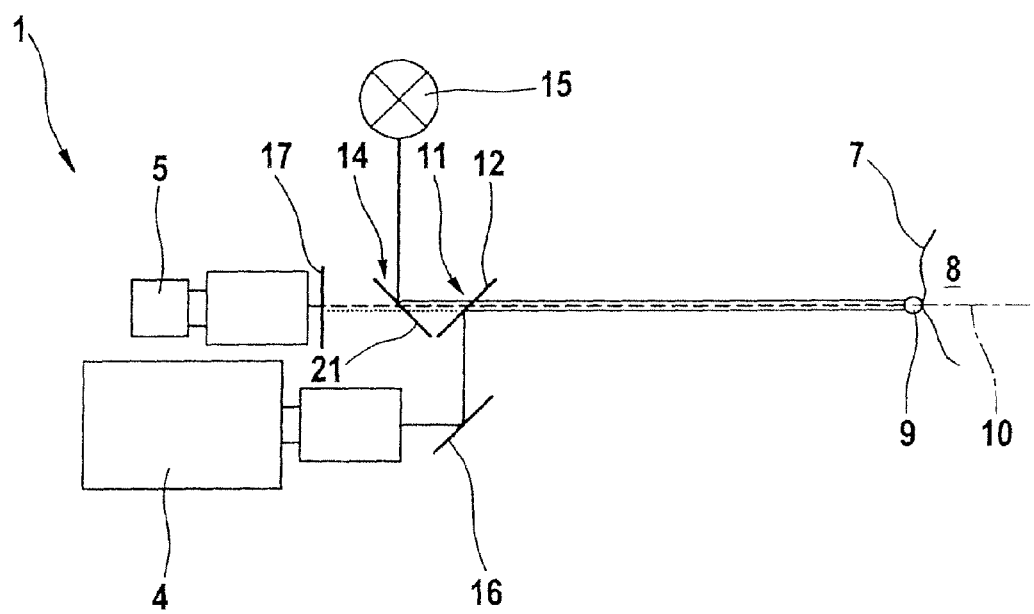
FIG. 9 shows a measuring apparatus with an illumination device arranged orthogonal to the optical axis.

Illustrated in FIG. 9 is a measuring apparatus 1 in which a light source 15 generates a light beam that is directed in a fashion orthogonal to the optical axis 10 and is deflected in the direction of the optical axis 10 by a semitransparent mirror 21. The aim of this is to explain that not only an illumination device 6 in accordance with FIGS. 1 to 8 fulfils the requirements of an illumination aligned coaxially with the optical axis 10, but also another arrangement, provided that the light beam is deflected in the direction of the optical axis 10 by one or more mirrors 16, and thereby permits the operating point 9 on the surface 7 of the measurement object 8 to be illuminated without shadows.

It is also conceivable to use an illumination device 6 (not illustrated) in the case of which each point light source 13 has an individual focusing lens for projecting onto the operating point 9, or use is made for all point light sources 13 of common optics that do not influence the camera apparatus 5. It is preferred here to use point light sources 13 with a luminous intensity of greater than 2000 mcd or a luminous flux of greater than 5 lm.

LIST OF REFERENCE NUMERALS

1 Measuring apparatus
2 Measuring head
3 Housing
4 Distance measuring device
5 Camera apparatus
6 Illumination device
7 Surface of the measurement object 8
8 Measurement object
9 Operating point
10 Optical axis
11 Mirror and filter device
12 Dichroic mirror
13 Punctiform light sources/LED/halogen/xenon
14 Optical device
15 Light source
16 Mirror
17 Filter
18 Positioning device
19 Translatory or rotatory mirror control device
20 Rotatory mirror control device
21 Semitransparent mirror While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A measuring apparatus for contactless detection and recordation of cooling air bores in turbine blades provided with a surface having a renewed thermal barrier coating, the apparatus comprising:
   a measuring head including and holding a distance measuring device, a camera apparatus, and an illumination device on a common optical axis;
   wherein the illumination device is configured and arranged to illuminate a point of analysis on said surface of the renewed thermal barrier coating, said point of analysis being simultaneously focused on by the camera apparatus and the distance measuring device;
   wherein the distance measuring device operates at a first light wavelength, and wherein the camera apparatus and the illumination device operate at a second light wavelength different from said first light wavelength;
   a mirror and filter device located on the optical axis between the illumination device and the point of analysis, the mirror and filter device having at least one dichroic mirror that separately transmits and reflects said first and second light wavelengths respectively to the distance measuring device and the camera apparatus; and
   wherein the distance measuring device is configured and arranged to evaluate a distance of said cooling holes, a location of said cooling holes, or both, based on light of said first wavelength, and wherein the camera apparatus is configured and arranged to evaluate an image of said cooling holes based on light of said second wavelength.

2. The measuring apparatus as claimed in claim 1, further comprising:
   a positioning device configured and arranged to adjust at least one of the camera apparatus, the distance measuring device, and the illumination device relative to one another.

3. The measuring apparatus as claimed in claim 1, wherein the camera apparatus and the distance measuring device are arranged parallel or orthogonal to one another, in or on the measuring head.

4. The measuring apparatus as claimed in claim 1, further comprising at least one of:
   the illumination device comprising a LED, a halogen light source, a xenon light source, a stroboscope, or combinations thereof;
   the illumination device and the distance measuring device each comprising spectral main components, the illumination device spectral main components having a wavelength differing from that of the spectral main components of the distance measuring device;
   the illumination device comprising spectral main components having a wavelength of 400-520 nm;
   the illumination device comprising at least three punctiform light sources arranged on an annular contour with reference to the optical axis and are aligned at an angle of <15° to the optical axis;
   the illumination device comprises a fiberoptics apparatus; and
   an optical device configured and arranged to focus light emitted by the illumination device onto the operating point.

5. The measuring apparatus as claimed in claim 1, further comprising at least one of:
   the distance measuring device comprising an optical distance sensor;
   the distance measuring device comprises at least one of a conoscopic sensor and a laser;
   the distance measuring device comprises a laser that operates with a defined wavelength;
   the distance measuring device configured and arranged to emit light having a wavelength differing from the light emitted by the illumination device;
   a filter configured and arranged to reduce retroreflection of the distance measuring device, arranged directly upstream of the camera apparatus; and
   the distance measuring device and the illumination device are both configured and arranged to emit light coaxially.

6. The measuring apparatus as claimed in claim 1, further comprising at least one of:
   a robot, a computer, or a coordinate measuring machine in communication with the measuring apparatus; and
   a computer in control communication with at least one of the illumination device, the distance measuring device, and the camera apparatus.

7. The measuring apparatus as claimed in claim 1, further comprising at least one of:
   the camera apparatus comprises a telecentric zoom objective;
   the camera apparatus comprises a telecentric zoom objective with a drive unit;
   the camera apparatus comprises a remote microscope attachment;
   the camera apparatus comprises a digital image memory; and
   the camera apparatus has an imaging ratio between 1:5 and 5:1.

8. The measuring apparatus as claimed in claim 1, wherein an operating distance between the operating point and the measuring apparatus is greater than 70 mm.

9. A measuring apparatus for contactless detection of a distance between a surface of a measurement object and the measuring apparatus, and for simultaneous contactless visual detection of the surface, the apparatus comprising:
   a measuring head including and holding a distance measuring device, a camera apparatus, and an illumination device;
   wherein the illumination device is configured and arranged to illuminate an operating point on the surface of the measurement object that is simultaneously focused on by the camera apparatus and the distance measuring device; and
   a mirror and filter device located on an optical axis between the illumination device and the operating point, the mirror and filter device having at least one dichroic mirror that transmits or reflects light beams as a function of wavelength and splits light reflected by the operating point between the distance measuring device and the camera apparatus;
   wherein the illumination device including at least thee punctiform light sources arranged on an annular contour relative to the optical axis.

10. A measuring apparatus for contactless detection of a distance between a surface of a measurement object and the measuring apparatus, and for simultaneous contactless visual detection of the surface, the apparatus comprising:
   a measuring head including and holding a distance measuring device, a camera apparatus, and an illumination device;
   wherein the illumination device is configured and arranged to illuminate an operating point on the surface of the measurement object that is simultaneously focused on by the camera apparatus and the distance measuring device;
   a mirror and filter device located on an optical axis between the illumination device and the operating point, the mirror and filter device having at least one dichroic mirror that transmits or reflects light beams as a function of wavelength and splits light reflected by the operating point between the distance measuring device and the camera apparatus;
   wherein the illumination device including at least three punctiform light sources arranged on an annular contour relative to the optical axis; and
   wherein the punctiform light sources are aligned at an angle less than 15 degrees to the optical axis.

11. A method for contactless detection and recordation of cooling air bores in a turbine blade, the turbine blade having a renewed thermal barrier coating on an outer surface thereof which at least partially stops up at least one of the cooling air bores, the method comprising:
   providing a measuring apparatus comprising
      a measuring head including and holding a distance measuring device, a camera apparatus, and an illumination device,
      wherein the illumination device is configured and arranged to illuminate an operating point on the surface of the measurement object that is simultaneously focused on by the camera apparatus and the distance measuring device, and
      a mirror and filter device located on an optical axis between the illumination device and the operating point, the mirror and filter device having at least one dichroic mirror that transmits or reflects light beams as a function of wavelength and splits light reflected by the operating point between the distance measuring device and the camera apparatus; and
   measuring the position of said at least one partially stopped up cooling air bore with the measuring apparatus.

12. A method according to claim 11, further comprising:
   opening said at least one of the cooling air bores based on said measuring.

* * * * *